(12) United States Patent
Okuyama et al.

(10) Patent No.: US 12,437,221 B2
(45) Date of Patent: Oct. 7, 2025

(54) INFORMATION PROCESSING APPARATUS, ARITHMETIC DEVICE, AND INFORMATION PROCESSING METHOD

(71) Applicant: Hitachi, Ltd., Tokyo (JP)

(72) Inventors: Takuya Okuyama, Tokyo (JP); Masanao Yamaoka, Tokyo (JP)

(73) Assignee: Hitachi Vantara, Ltd., Yokohama (JP)

( * ) Notice: Subject to any disclaimer, the term of this patent is extended or adjusted under 35 U.S.C. 154(b) by 1093 days.

(21) Appl. No.: 17/429,954

(22) PCT Filed: Mar. 29, 2019

(86) PCT No.: PCT/JP2019/014172
§ 371 (c)(1),
(2) Date: Aug. 11, 2021

(87) PCT Pub. No.: WO2020/202312
PCT Pub. Date: Oct. 8, 2020

(65) Prior Publication Data
US 2022/0129780 A1  Apr. 28, 2022

(51) Int. Cl.
*G11C 11/00* (2006.01)
*G06F 18/2415* (2023.01)
(Continued)

(52) U.S. Cl.
CPC ......... *G06N 10/20* (2022.01); *G06F 18/2415* (2023.01); *G06N 10/40* (2022.01); *G06N 10/60* (2022.01); *H10N 50/10* (2023.02)

(58) Field of Classification Search
CPC ......... G06N 10/20; G06N 10/40; G06N 10/60
See application file for complete search history.

(56) References Cited

U.S. PATENT DOCUMENTS 11,816,595 B2 * 11/2023 Hidaka ................... G06N 7/01
2006/0260013 A1    11/2006 Harrison et al.
(Continued)

FOREIGN PATENT DOCUMENTS

JP    2016-51313 A    4/2016

OTHER PUBLICATIONS

Vicky Choi, et al. "Minor-Embedding in Adiabatic Quantum Computation: I. The Parameter Setting Problem", Quantum Information Processing, 7 (5), Apr. 30, 2008.
(Continued)

*Primary Examiner* — Pho M Luu
(74) *Attorney, Agent, or Firm* — Mattingly & Malur, PC (57) ABSTRACT

Searching for a ground state of an Ising model is performed so that a combinatorial optimization problem is efficiently solved. An information processing apparatus stores an energy function setting an interaction between an i-th spin of a first spin group and a j-th spin of a second spin group so that the i-th spin of the first spin group and the j-th spin of the second spin group have the same value in a ground state in an interaction relationship of an Ising model represented as a complete bipartite graph connecting N spins of the first spin group and of the second spin group, and searches for the ground state of the Ising model based on the energy function and information unique to the spins. The search for the ground state of the Ising model is performed by applying an algorithm of simulated annealing method to the above-mentioned energy function.

9 Claims, 7 Drawing Sheets

(51) Int. Cl.
  *G06N 10/20* (2022.01)
  *G06N 10/40* (2022.01)
  *G06N 10/60* (2022.01)
  *H10N 50/10* (2023.01)

(56) References Cited

U.S. PATENT DOCUMENTS

2016/0063725 A1    3/2016  Yoshimura
2019/0087388 A1*   3/2019  Venturelli ................ G06N 5/01
2024/0394328 A1*  11/2024  Takesue .................. G06F 17/11

OTHER PUBLICATIONS

Vicky Choi, "Minor-embedding in adiabatic quantum computation: II. Minor-universal graph design", arXiv, Jan. 19, 2010, <URL:https://arxiv.org/pdf/1001.3116v2>.

International Search Report of PCT/JP2019/014172 dated Jul. 2, 2019.

* cited by examiner

INFORMATION PROCESSING APPARATUS, ARITHMETIC DEVICE, AND INFORMATION PROCESSING METHOD

TECHNICAL FIELD

The present invention relates to an information processing apparatus, an arithmetic device, and an information processing method.

BACKGROUND ART

JP-A-2016-51313 (PTL 1) discloses, "provides a semiconductor device in which components serving as basic constituent units for obtaining a solution of an interaction model are arranged in an array" and "includes a plurality of units having, each unit including, a first memory cell that stores a value indicating a state of one node of the interaction model, a second memory cell that stores an interaction coefficient indicating the interaction from another node connected to one node, a third memory cell that stores a flag for fixing the value of the first memory cell, a first arithmetic circuit that determines a value indicating a next state of the one node based on a value indicating the state of another node and the interaction coefficient, a second arithmetic circuit that determines whether or not to record the value indicating the next state in the first memory cell according to the value of the flag".

NPL 1 describes minor-embedding (minor-embedding in adiabatic quantum optimization) in quantum annealing (adiabatic quantum computation) (adiabatic quantum optimization).

CITATION LIST

Patent Literature

PTL 1: JP-A-2016-51313

Non-Patent Literature

NPL 1: Choi, V. (2008). Minor-embedding in adiabatic quantum computation: I. The parameter setting problem. Quantum Information Processing, 7 (5), 193-209.

SUMMARY OF INVENTION

Technical Problem

Many physical and social phenomena can be represented by interaction models. The interaction model is defined by a plurality of nodes that constitute the model, interaction between the nodes, and if necessary, a bias for each node. Various models have been proposed in the fields of physics and social science, but all can be interpreted as a form of interaction model.

There is an Ising model as one of the interaction models. In the Ising model, searching for the ground state is an optimization problem for obtaining a spin array that minimizes an energy function of the Ising model. As a method for searching the ground state of the Ising model, there is a Markov chain Monte Carlo method (hereinafter referred to as MCMC). In the MCMC, a desired statistic quantity is estimated by performing sampling of states while performing probabilistically transitioning between states.

Herein, when a so-called combinatorial optimization problem is transformed into a problem of searching for the ground state of the Ising model, the interaction between the spins becomes a dense structure (a structure in which each spin is adjacent to all other spins). For this reason, it is not possible to perform probabilistic processes for spins at the same time, and there is a problem that it is difficult to speed up the process when searching for the ground state of the Ising model, for example, by using a semiconductor device.

The present invention has been made in view of such a background, and an object of the present invention is to provide an information processing apparatus and an information processing method capable of efficiently searching for a ground state of an Ising model.

Solution to Problem

One of the present inventions for achieving the above object is to provide an information processing apparatus including: storage unit which stores an energy function setting an interaction between an i-th spin of a first spin group and a j-th spin of a second spin group so that the i-th spin of the first spin group and the j-th(=i-th) spin of the second spin group have the same value in a ground state in an interaction relationship of an Ising model represented as a complete bipartite graph connecting N spins of the first spin group and N spins of the second spin group; and a ground state searching unit which searches for the ground state of the Ising model based on the energy function and information unique to the spins.

In addition, the problems and the solutions thereof disclosed in the present application will be clarified by columns of a form for carrying out the invention and the drawings.

Advantageous Effects of Invention

According to the present invention, it is possible to efficiently perform searching for a ground state of an Ising model. Problems, configurations, and effects other than those described above will be clarified by the following description of embodiments for carrying out the invention.

DESCRIPTION OF EMBODIMENTS

Hereinafter, embodiments will be described in detail with reference to the drawings. In the following description, the same or similar configurations may be denoted by the same reference numeral, and redundant description thereof may be omitted. In addition, a plurality of elements having the same or similar functions may be denoted by the same reference numerals attached with different subscripts. If the plurality of elements are not necessarily distinguished, the subscripts may be omitted for explanation.

First, an Ising model will be described. The Ising model is a model of statistical mechanics used to explain a behavior of magnetic materials. The Ising model is defined by using a spin state that takes a binary value of +1/−1 (which may be "0/1", "up/down", or the like) and an interaction coefficient indicating an interaction between the spins. An energy function H(σ) (generally called Hamiltonian) of the Ising model is expressed as the following Formula.

[Formula 1]

$$H(\sigma) = -\sum_{i<j} J_{i,j}\sigma_i\sigma_j - \sum_{i<j} h_i\sigma_i \quad \text{Formula 1}$$

In Formula 1, $\sigma_i$ represents a value of an i-th spin, $J_{i,j}$ represent an interaction coefficient between the i-th and j-th spins, and $h_i$ represents an external magnetic field coefficient acting on the i-th spin. A matrix J and a vector h that collectively represent these are introduced. In the matrix J, the elements of i-th row and j-column are $J_{i,j}$ and the diagonal components are 0. In addition, the i-th element of the vector h is $h_i$.

A connection relationship between the spins of the Ising model is represented by graph G=(V,E). V={$v_1, \ldots, v_N$} is a set of vertices, and it is considered that there is a spin $\sigma_i$ of the Ising model on each vertex $v_i$.

The right-hand side of Formula 1 is a sum of energies resulting from the interactions between the spins. Generally, the Ising model is expressed as an undirected graph and does not distinguish between the interaction from the i-th spin to the j-th spin and the interaction from the j-th spin to the i-th spin. For this reason, in Formula 1, an influence of the interaction on a combination of $\sigma_i$ and $\sigma_j$ that satisfies i<j is obtained.

Searching for a ground state of the Ising model is an optimization problem for obtaining a spin array that minimizes an energy function of the Ising model. In this embodiment, the searching for the ground state of the Ising model is performed by the Markov chain Monte Carlo methods (hereinafter referred to as MCMC).

Figure 1:
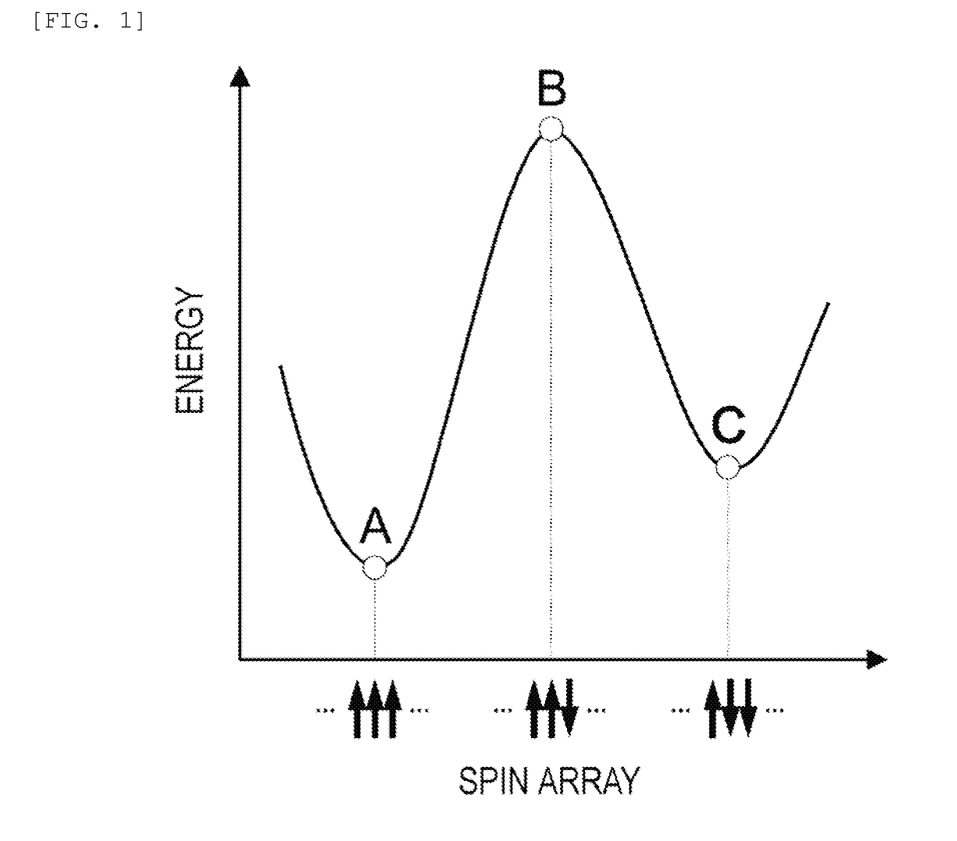
FIG. 1 is a conceptual diagram of an energy landscape of an Ising model.

FIG. 1 is a conceptual diagram of an energy landscape of the Ising model. A horizontal axis of the graph is the spin array, and a vertical axis is a total energy of a system. In probabilistic transition, probabilistic transition from a current state σ to a certain state σ' in the vicinity of the state σ is repeated. A probability of transition from the state σ to the state σ' is hereinafter referred to as a transition probability P(σ, σ'). As an example of the transition probability P(σ, σ'), there are transition probabilities according to the metropolis method and transition probabilities according to a heat bath method. The formula for calculating the transition probability P(σ, σ') in the metropolis method is illustrated below.

[Formula 2]

$$P(\sigma, \sigma') = \min\left\{1, \exp\left(-\frac{H(\sigma') - H(\sigma)}{T}\right)\right\} \quad \text{Formula 2}$$

In Formula 2, T is a parameter generally called temperature, which represents the easiness of transition between states.

As a general method of generating the state σ' in the vicinity of the current state σ, there is a method of changing the value of one spin from the current state σ. By changing the spins to be changed one by one, the searching is performed for the states that the entire spin can take. For example, in the case of FIG. 1, when one spin is inverted from a state A, the state A becomes a state B, and when one spin is further inverted, the state becomes a state C.

When the MCMC is performed while gradually decreasing the temperature T from a large value, the energy asymptotically converges to the lowest energy state. As a method for obtaining an optimum solution or an approximate solution of a minimization problem by utilizing this, there is simulated annealing (hereinafter referred to as SA).

When the MCMC or the SA is applied to the Ising model, the value of the spin is probabilistically determined based on Formula 2. Herein, it is possible to apply state transition based on Formula 2 to a plurality of non-adjacent spins at the same time. For this reason, for example, as described in PTL 1, by preparing a plurality of circuits implementing probabilistic processes based on Formula 2 and updating values of a plurality of non-adjacent spins in parallel, it is possible to speed up the processes of the MCMC and the SA.

Figure 2:
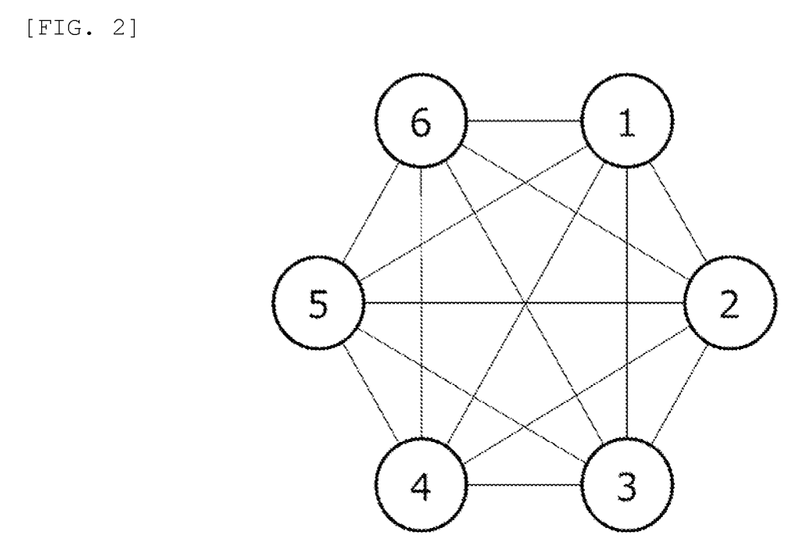
FIG. 2 is a graph illustrating an interaction relationship between spins of the Ising model as a complete graph.

FIG. 2 is a complete graph (fully connected graph) illustrating an interaction relationship between the entire spins of the Ising model when the number of spins is 6. When the combinatorial optimization problem is transformed into the problem of searching for the ground state of the Ising model, the interaction relationship between the spins becomes a dense structure (a structure in which each spin is adjacent to all other spins) as illustrated in the figure. For this reason, it is not possible to perform the probabilistic processes of the spins at the same time, and it is difficult to speed up the process of the MCMC and the SA. Conversely, when the plurality of spins can be updated at the same time while satisfying a theoretical background required by the MCMC for the Ising model with such a dense interaction relationship, it is possible to speed up the processes of the MCMC or the SA, and thus, it is possible to efficiently solve the combinatorial optimization problem. In the present embodiment, based on this viewpoint, the ground state is obtained by a method of converting the interaction relationship of the Ising model into a complete bipartite graph. Hereinafter, this method will be described.

Figure 3:
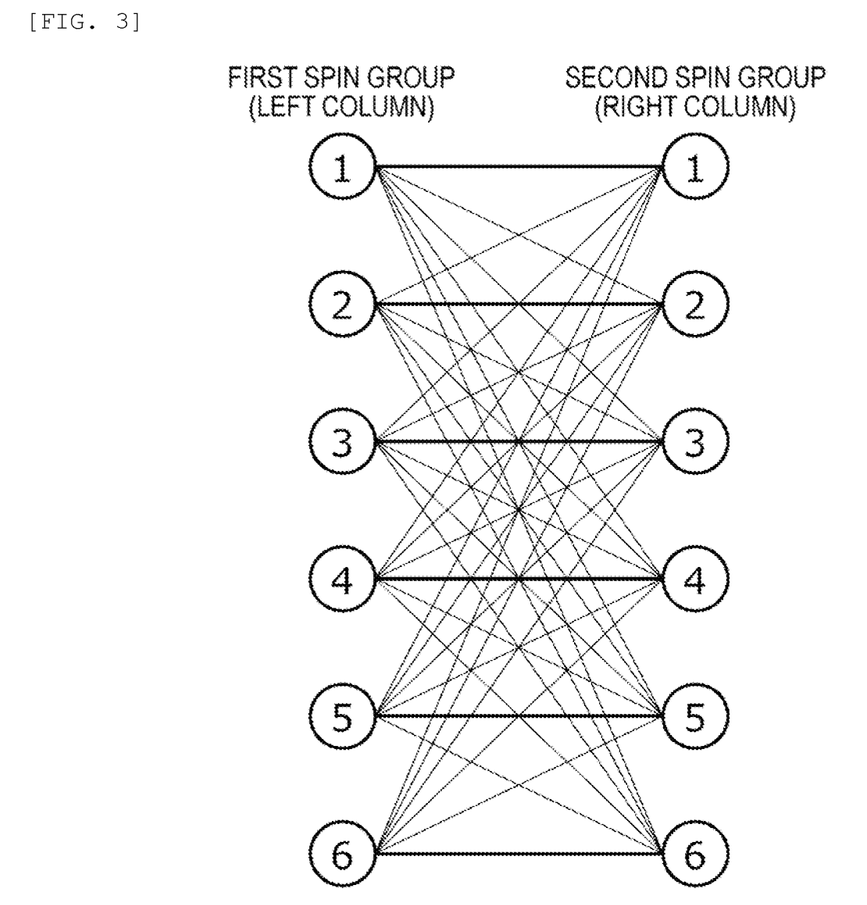
FIG. 3 is a graph illustrating the interaction relationship between spins of the Ising model as a complete bipartite graph.

FIG. 3 is a diagram illustrating the interaction relationship of the Ising model as a complete bipartite graph. A complete graph as illustrated in FIG. 2 can be converted into a complete bipartite graph. In this example, the number of spins is set to 6. In the same manner as a complete graph, the interactions $J_{i,j}$ act between the i-th spin of the left column spin group (hereinafter, referred to as a first spin group) and the j-th spin of the right column spin group (hereinafter, referred to as a second spin group) illustrated in the figure. In addition, in the complete bipartite graph, the interactions illustrated by thick lines in the figure are introduced between the corresponding spins in the right column and the left column. Hereinafter, the interaction coefficient between the i-th spin of the first spin group and the i-th spin of the second spin group is referred to as $w_i$.

As described in NPL 1, when the interaction $w_i$ is set to a sufficiently large value, the value of the i-th spin of the first spin group and the value of the i-th spin of the second spin group are the same value in the ground state of the Ising model illustrated in the figure. For example, NPL 1 discloses that, when the interaction coefficient $w_i$ satisfies the following Formula 3, the value of the first spin group and the value of the second spin group are the same value in the ground state.

[Formula 3]

$$w_i \geq \sum_j |J_{i,j}| \quad \text{Formula 3}$$

In addition, it can be illustrated that the value satisfying the following Formula 4 also satisfies the condition. Herein, $\lambda$ is a minimum eigenvalue of the matrix J. Also herein, $\lambda$ may be a maximum eigenvalue of $-J$ (sign-inverted matrix of the matrix J).

[Formula 4]

$$w_i \geq \begin{cases} \sum_{v_j \varepsilon v} |J_{i,j}| - \frac{1}{2} \sum_{v_j \varepsilon C} |J_{i,j}| & (v_j \varepsilon C) \\ -\frac{\lambda}{2} & (v_j \varepsilon C) \end{cases} \quad \text{Formula 4}$$

The set C may be any subset of the vertex set. For example, the method of determining Formula 5 can be considered.

[Formula 5]

$$c = \{v_i | \lambda \geq \Sigma_{v_j \in v} |J_{i,j}|\} \quad \text{Formula 5}$$

It is assumed that the first spin group and the second spin group have the same value in the ground state. The total number of spins of each of the first spin group and the second spin group is defined as N, and the value of the i-th spin of each of the first spin group and the second spin group in the ground state is defined as $S_i$ (i=1 to N). At this time, the energy H of the Ising model in the ground state can be expressed as Formula 6.

[Formula 6]

$$H = -2 \sum_{i<j} J_{i,j} S_i S_j - \sum_i w_i \quad \text{Formula 6}$$

The $w_i$ of the second term on the right-hand side of Formula 6 is the interaction coefficient between the i-th spin of the first spin group and the j (=i)-th spin of the second spin group and is a constant that does not depend on $S_1, \ldots, S_N$. That is, the values $S_1, \ldots, S_N$ are the solutions of Formula 7 illustrated below.

[Formula 7]

$$\operatorname*{argmin}_{x_1,\ldots,x_N} - \sum_{i<j} J_{i,j} x_i x_j \quad \text{Formula 7}$$

Therefore, the spins $S_1, \ldots, S_N$ can be regarded as $\sigma_1, \ldots, \sigma_N$ which minimizes Formula 1 by the Ising model represented by the complete graph. That is, the spin array of each column in the ground state of the model represented by the complete bipartite graph illustrated in FIG. 3 is equal to the ground state of the Ising model represented by the complete graph (fully connected graph) illustrated in FIG. 2. In addition, since the graph illustrated in FIG. 3 is a bipartite graph, there is no interaction between the adjacent spins of the first spin group, and similarly, there is no interaction between the adjacent spins of the second spin group. Therefore, when the MCMC is executed on the model illustrated in FIG. 3, the values of the spins of each group can be updated at the same time, and the searching for the ground state can be efficiently performed.

Next, a case is considered where the spins are updated by the metropolis method. In the following description, the values of the spins in the first spin group (left column) are expressed as $\sigma^L_1, \ldots, \sigma^L_N$, respectively, and similarly, the values of the spins in the second spin group (right column) are expressed as $\sigma^R_1, \ldots, \sigma^R_N$, respectively. Herein, a difference $\Delta H$ of the energy H when the value $\sigma^R_i$ of the i-th spin of the second spin group is inverted can be obtained from Formula 8.

[Formula 8]

$$\Delta H = 2\sigma^R_i \left( h_i + w_i \sigma^L_i + \sum_{k \neq i} J_{i,k} \sigma^L_k \right) \quad \text{Formula 8}$$

As described above, in the metropolis method, an acceptance probability (transition probability) of the state transition at the temperature T is expressed as Formula 2. Therefore, when a uniform random number u (0<u≤1) is used, a condition for accepting the state transition can be expressed as the following Formula.

[Formula 9]

$$\Delta H \leq -T \cdot \ln(u) \quad \text{Formula 9}$$

Herein, a case is considered where the spin value $\sigma^R_i$ of the second spin group becomes +1 after the state transition. First, if the spin value $\sigma^R_i$ of the second spin group before the state transition is +1, then $\Delta H > -T \cdot \ln(u)$, that is, the condition is satisfied when the following Formula is obtained from Formula 8.

[Formula 10]

$$h_i + w_i \sigma^L_i + \sum_{k \neq i} J_{i,k} \sigma^L_k > -\frac{T \cdot \ln(u)}{2} \quad \text{Formula 10}$$

Similarly, when the spin value $\sigma^R_i$ of the second spin group before the state transition is $-1$, then $\Delta H \leq -T \cdot \ln(u)$, that is, the spin value $\sigma^R_i$ of the second spin group after the state transition becomes +1 when the following Formula 11 is obtained from Formula 8.

[Formula 11]

$$h_i + w_i \sigma^L_i + \sum_{k \neq i} J_{i,k} \sigma^L_k \geq \frac{T \cdot \ln(u)}{2} \quad \text{Formula 11}$$

Therefore, it can be seen that, when the following Formula 12 is satisfied, regardless of the spin value $\sigma^R_i$ of the second spin group before the state transition, the spin value $\sigma^R_i$ of the second spin group after the state transition becomes +1.

[Formula 12]

$$h_i + w_i \sigma^L_i + \sum_{k \neq i} J_{i,k} \sigma^L_k \geq \sigma^R_i \frac{-T \cdot \ln(u)}{2} \quad \text{Formula 12}$$

After all, in order to execute the state transition according to the metropolis method, the next state of the spin value $\sigma^R_i$ of the second spin group may be obtained from the following Formula. A function sign (x) in the following Formula 13 is a function that returns +1 if x≥0 and −1 if x<0.

[Formula 13]

$$\sigma^R_i \leftarrow \text{sign}\left(2\sum_{k \neq i} J_{i,k}\sigma^L_k + 2w_i\sigma^L_i + 2h_i + \sigma^R_i \cdot T \cdot \ln(u)\right) \quad \text{Formula 13}$$

Herein, Formula 13 is a formula for focusing on one spin in the second spin group and determining the next state of the spin according to the Metropolis method. When the interactions $J_{i,j}$ acting between the i-th spin of the first spin group and the j-th spin of the second spin group are sufficiently large, Formula 13 can be applied to the values $\sigma^R_i$ of the plurality of spins of the second spin group at the same time. Therefore, when the plurality of spins are to be updated at the same time, the next state of each spin of the second spin group may be obtained from the following Formula 14. However, it is assumed that the function sign expressed in Formula 14 gives a sign to each element of the vector given as an argument.

[Formula 14]

$$\begin{bmatrix}\sigma^R_1\\ \vdots\\ \sigma^R_n\end{bmatrix} \leftarrow \text{sign}\left(2h+2J\begin{bmatrix}\sigma^L_1\\ \vdots\\ \sigma^L_n\end{bmatrix}+2\begin{bmatrix}w_i & 0\\ & \ddots & \\ 0 & & \omega_n\end{bmatrix}\begin{bmatrix}\sigma^L_1\\ \vdots\\ \sigma^L_n\end{bmatrix}+T\begin{bmatrix}\ln u_1 & 0\\ & \ddots & \\ 0 & & \ln u_n\end{bmatrix}\begin{bmatrix}\sigma^R_1\\ \vdots\\ \sigma^R_n\end{bmatrix}\right) \quad \text{Formula 14}$$

Heretofore, a spin updating rule of the second spin group has been described, but the same applies to the spin of the first spin group, and the following updating rule can be obtained.

[Formula 15]

$$\begin{bmatrix}\sigma^L_1\\ \vdots\\ \sigma^L_n\end{bmatrix} \leftarrow \text{sign}\left(2h+2J\begin{bmatrix}\sigma^R_1\\ \vdots\\ \sigma^R_n\end{bmatrix}+2\begin{bmatrix}w_i & 0\\ & \ddots & \\ 0 & & w_n\end{bmatrix}\begin{bmatrix}\sigma^R_1\\ \vdots\\ \sigma^R_n\end{bmatrix}+T\begin{bmatrix}\ln u_1 & 0\\ & \ddots & \\ 0 & & \ln u_n\end{bmatrix}\begin{bmatrix}\sigma^L_1\\ \vdots\\ \sigma^L_n\end{bmatrix}\right) \quad \text{Formula 15}$$

Figure 4:
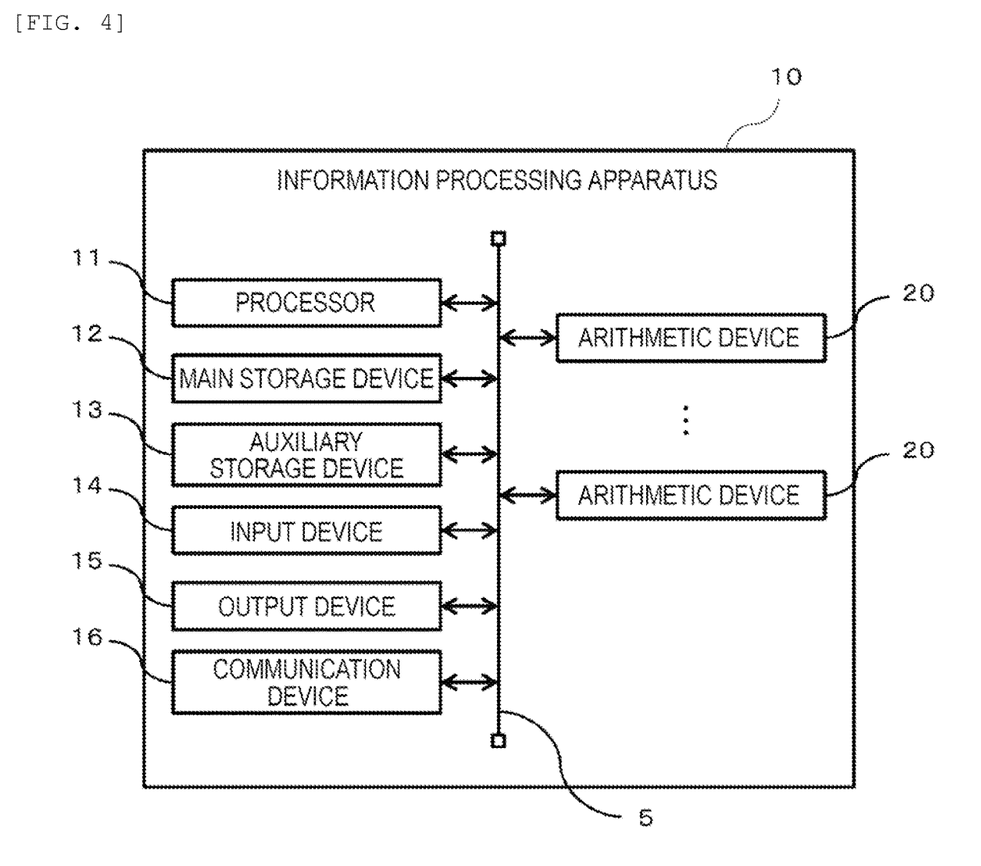
FIG. 4 is a block diagram illustrating a schematic configuration of an information processing apparatus.

FIG. 4 is an example of the information processing apparatus that searches for the ground state of the Ising model based on Formulas 14 and 15. As illustrated in the figures, an information processing apparatus 10 includes a processor 11, a main storage device 12, an auxiliary storage device 13, an input device 14, an output device 15, a communication device 16, one or more arithmetic devices 20, and a system bus 5 for communicably connecting the devices. A portion or all of the information processing apparatus 10 may be implemented by using virtual information processing resources such as a cloud server provided by a cloud system. In addition, the information processing apparatus 10 may be implemented by, for example, a plurality of information processing apparatuses that are communicably connected to operate in cooperation with each other.

The processor 11 is configured by using, for example, a central processing unit (CPU) or a micro processing unit (MPU). The main storage device 12 is a device that stores programs and data and is, for example, a read only memory (ROM) such as a static random access memory (SRAM), a non-volatile RAM (NVRAM), a mask read only memory (Mask ROM), or a programmable ROM (PROM) or a random access memory (RAM) such as a dynamic random access memory (DRAM), or the like. The auxiliary storage device 13 is a hard disk drive, a flash memory, a solid state drive (SSD), an optical storage device such as a compact disc (CD) or a digital versatile disc (DVD), or the like. The programs and data stored in the auxiliary storage device 13 are read into the main storage device 12 at any time.

The input device 14 is a user interface that receives input of information from a user and is, for example, a keyboard, a mouse, a card reader, a touch panel, or the like. The output device 15 is a user interface that supplies information to the user and is, for example, a display device (liquid crystal display (LCD), a graphic card, or the like) that visualizes various information, an audio output device (speaker), a printing device, or the like. The communication device 16 is a communication interface that communicates with other devices and is, for example, a network interface card (NIC), a wireless communication module, a universal serial interface (USB) module, a serial communication module, or the like.

The arithmetic device 20 is a device that executes processes related to the searching for the ground state of the Ising model. The arithmetic device 20 may have a form of an expansion card attached to the information processing apparatus 10 such as a graphics processing unit (GPU). The arithmetic device 20 is configured with hardware such as a complementary metal oxide semiconductor (CMOS) circuit, a field programmable gate array (FPGA), and an application specific integrated circuit (ASIC). The arithmetic device 20 includes a control device, a storage device, and an interface for being connected to the system bus 5 and transmits and receives commands and information to and from the processor 11 via the system bus 5. The arithmetic device 20 may be, for example, a device that is communicably connected to another arithmetic device 20 via a communication line and operates in cooperation with the other arithmetic device 20. The function implemented by the arithmetic device 20 may be implemented, for example, by allowing a processor (CPU, GPU, or the like) to execute a program.

Figure 5:
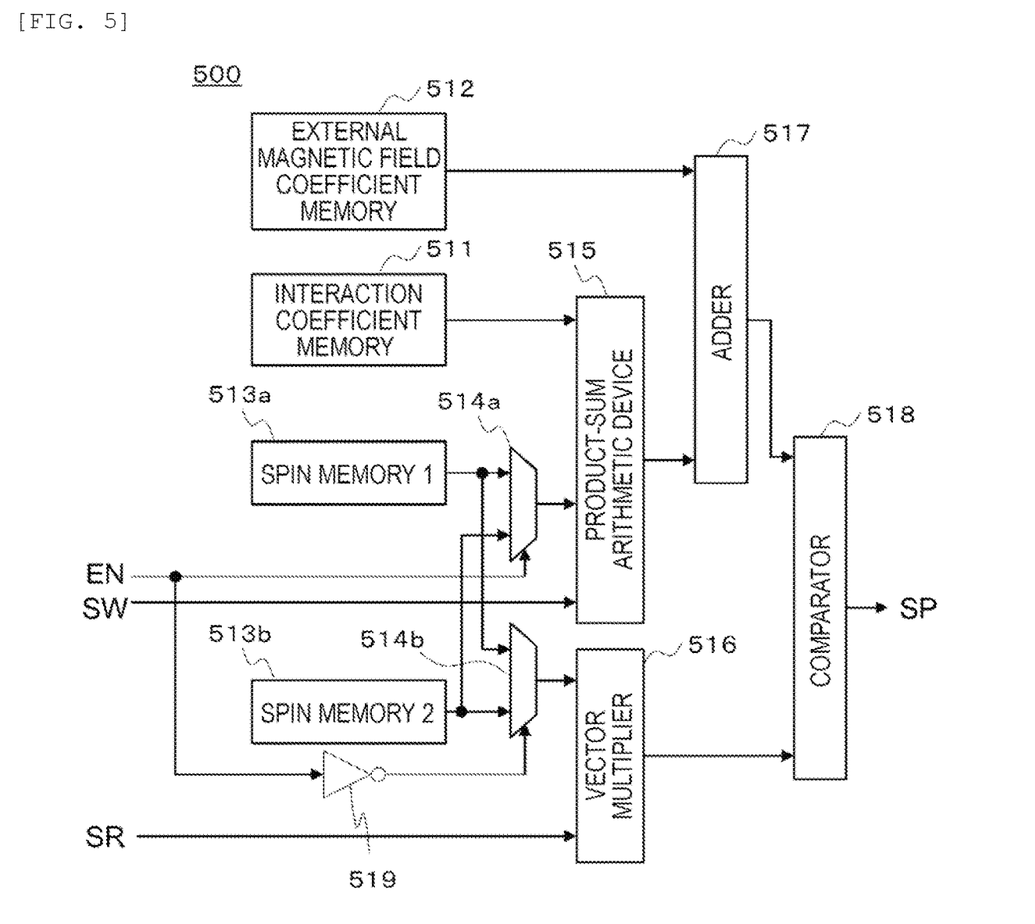
FIG. 5 is a block diagram of an arithmetic circuit.

FIG. 5 is a diagram illustrating the operating principle of the arithmetic device 20 and is a block diagram of a circuit (hereinafter, referred to as an arithmetic circuit 500) constituting the arithmetic device 20. The arithmetic circuit 500 implements functions corresponding to Formulas 14 and 15. Hereinafter, the operating principle of the arithmetic device 20 will be described with reference to the drawings. In the following description, the number of spins handled by the arithmetic circuit 500 is indicated by N.

As illustrated in the figure, the arithmetic circuit 500 includes an interaction coefficient memory 511, an external magnetic field coefficient memory 512, a first spin memory 513a, a second spin memory 513b, a first selector 514a, a second selector 514b, a product-sum arithmetic device 515, a vector multiplier 516, an adder 517, a comparator 518, and a negation (NOT) circuit 519.

Information indicating the matrix J (hereinafter, referred to as an adjacency matrix) is stored in the interaction coefficient memory 511. The adjacency matrix is generally a symmetric matrix, and the use amount of the memory 511 can be reduced by using this symmetry. Information indicating the vector h is stored in the external magnetic field coefficient memory 512.

The first spin memory 513a stores information of an N-dimensional vector indicating the spin states of the first spin group of the complete bipartite graph described above. The second spin memory 513b stores information of an N-dimensional vector indicating the spin states of the second spin group of the complete bipartite graph described above (refer to FIG. 3).

As illustrated in the figure, a signal EN, a signal SW, and a signal SR are input to the arithmetic circuit 500. The comparator 518 outputs a signal SP.

The signal EN is a signal that periodically repeats the values of H (high) and L (low). When the signal EN is H (high), the first selector 514a outputs the value of the first spin memory 513a, and the second selector 514b outputs the value of the second spin memory 513b. When the signal EN is L (low), the first selector 514a outputs the value of the second spin memory 513b, and the second selector 514b outputs the value of the first spin memory 513a. The first selector 514a and the second selector 514b may operate as described above by the signal EN having the opposite phase (reverse logic) to the above-mentioned phase.

The signal SW is a signal representing an N-element vector (N-dimensional vector).

The value of the adjacency matrix (interaction coefficient $J_{i,j}$), the signal SW, and the output of the first selector 514a stored in the interaction coefficient memory 511 are input to the product-sum arithmetic device 515. Herein, when the N-dimensional vector that is the output of the first selector 514a is indicated by x and the N-dimensional vector represented by the signal SW is indicated by $w=(W_1, \ldots, W_N)$, the product-sum arithmetic device 515 outputs the N-dimensional vector y such as $y=(J+\text{diag}(W_1, \ldots, W_N)) x$. In addition, the adder 517 outputs the sum of the input 2 vectors, that is, $(J+\text{diag}(W_1, \ldots, W_N)) x+h$.

As described above, the value $w_i$ is calculated based on Formula 4. This calculation may be performed outside the arithmetic device 20, for example, the processor 11. Moreover, the calculation is easily performed in the arithmetic device 20. The maximum eigenvalue of the matrix J is required for the calculation of Formula 4, and the maximum eigenvalue attached with origin shift can be efficiently calculated by a commonly known algorithm called a power iteration method. This is to repeatedly execute a matrix-vector product, and the product-sum arithmetic device 515 can be utilized.

The signal SR represents an N-dimensional vector in which each element is a random number independent of each other. In this example, each element is the product of the temperature T and the random number $-\ln(u)/2$. However, u is a uniform random number ($0<u\leq1$).

The N-dimensional vector output from the second selector 514b and the N-dimensional signal SR are input to the vector multiplier 516. The vector multiplier 516 calculates and outputs the product of corresponding element like the product of the first element and the product of the second element. Therefore, the output signal of the vector multiplier 516 is also an N-dimensional vector.

The N-dimensional vector output from the product-sum arithmetic device 515 and the N-dimensional vector output from the vector multiplier 516 are input to the comparator 518. The comparator 518 compares the corresponding elements of the input N-dimensional vectors and outputs the comparison result (magnitude relationship between the elements). For example, when the first elements of the two input signals of the comparator 518 are compared, if the signal of the product-sum arithmetic device 515 is large, the comparator 518 sets 1 to the first element, and if the signal of the product-sum arithmetic device 515 is small, the comparator 518 sets −1 to the first element.

The signal SP output from the comparator 518 is the next state of spin based on the MCMC described above. When the signal EN is H (High), the information of the signal SP is written in the first spin memory 513a, and when the signal EN is L (Low), the information of the signal SP is written in the second spin memory 513b.

Figure 6:
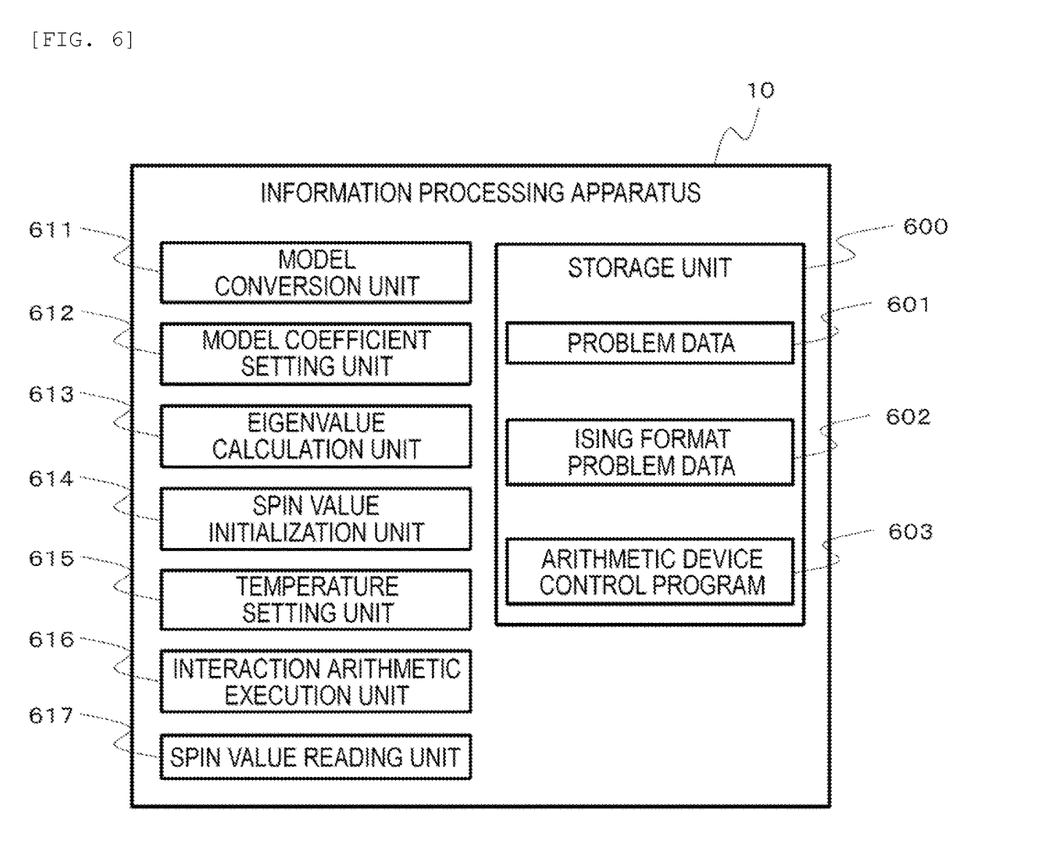
FIG. 6 is a functional block diagram illustrating main functions of the information processing apparatus.

FIG. 6 illustrates main functions (software configuration) included in the information processing apparatus 10. As illustrated in the figure, the information processing apparatus 10 includes a storage unit 600, a model conversion unit 611, a model coefficient setting unit 612, an eigenvalue calculation unit 613, a spin value initialization unit 614, a temperature setting unit 615, an interaction arithmetic execution unit 616, and a spin value reading unit 617. These functions are implemented by the processor 11 reading and executing the program stored in the main storage device 12 or by hardware included in the arithmetic device 20. In addition to the above-described functions, the information processing apparatus 10 may have other functions such as an operating system, a file system, a device driver, and a database management system (DBMS).

Among the above functions, the storage unit 600 stores a problem data 601, an Ising format problem data 602, and an arithmetic device control program 603 in the main storage device 12 or the auxiliary storage device 13. The problem data 601 is a data in which, for example, the combinatorial optimization problem or the like is described in a predetermined description format. The problem data 601 is set by the user, for example, via the user interface (input device, output device, communication device, or the like). The Ising format problem data 602 is a data generated by the model conversion unit 611 converting the problem data 601 into the Ising model format data. The arithmetic device control program 603 is a program that is executed when the interaction arithmetic execution unit 616 controls the arithmetic device 20 or is loaded by the interaction arithmetic execution unit 616 into the individual arithmetic devices 20 and executed by the arithmetic device 20.

The model conversion unit 611 converts the problem data 601 into the Ising format problem data 602 which is a data in an Ising model format. The functions of the model conversion unit 611 are not necessarily implemented in the information processing apparatus 10, and the information processing apparatus 10 may take the Ising format problem data 602 generated by another information processing apparatus or the like via the input device 14 or the communication device 16.

The model coefficient setting unit 612 sets the adjacency matrix J described above in the interaction coefficient memory 511 and sets the vector h representing the external magnetic field coefficient in the external magnetic field coefficient memory 512 for the interaction relationship of the Ising model based on the Ising format problem data 602.

The spin value initialization unit 614 initializes the values of the spins stored in a first spin memory 512a and a second spin memory 512b of the arithmetic device 20. For example, the spin value initialization unit 614 sets all the values of the values $\sigma^L_1, \ldots, \sigma^L_N$ of the spins of the first spin group and the values $\sigma^R_1, \ldots, \sigma^R_N$ of the spins of the second spin group in the complete bipartite graph to "1" or "−1" with a probability of 50%.

The temperature setting unit 615 sets the values of the temperature T in Formulas 14 and 15 used by the interaction arithmetic execution unit 616 when searching for the ground state of the Ising model.

The interaction arithmetic execution unit 616 performs an arithmetic (hereinafter, referred to as an interaction arithmetic) of searching for the ground state of the Ising model according to Formulas 14 and 15 for each temperature T set by the temperature setting unit 615. In the interaction arithmetic, the interaction arithmetic execution unit 616 changes, for example, the temperature T from the higher side to the lower side.

When the searching for the ground state of the Ising model by the interaction arithmetic execution unit 616 is ended, the spin value reading unit 617 reads the values of the spins stored in the first spin memory 513a or the second spin memory 513b and outputs the read values to the output device 15 and the communication device 16.

Figure 7:
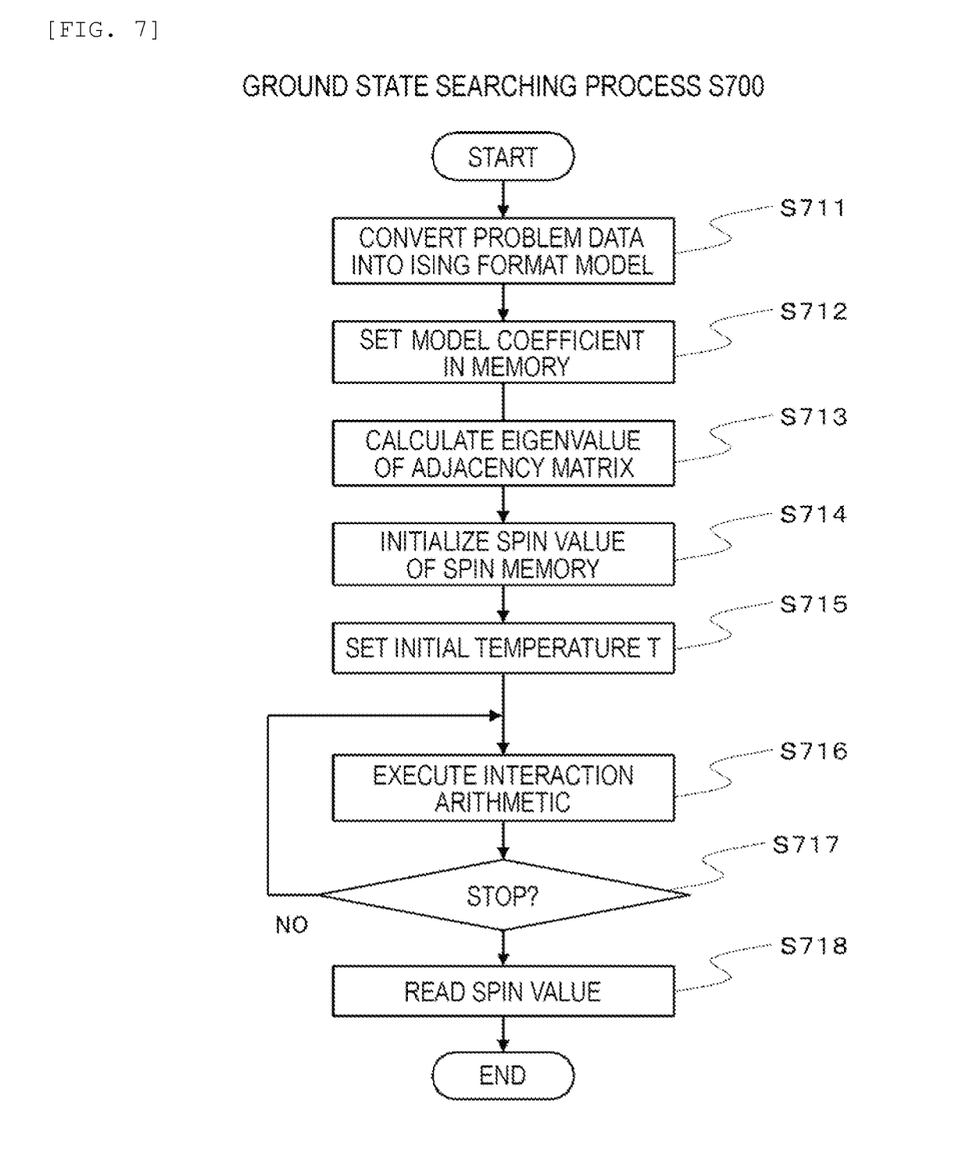
FIG. 7 is a flowchart illustrating a ground state searching process.

FIG. 7 is a flowchart illustrating processes (hereinafter, referred to as a ground state searching process S700) performed by the information processing apparatus 10 when searching for the ground state of the Ising model. Hereinafter, the ground state searching process S700 will be described with reference to the figure. In the following, the letter "S" attached before the code denotes a processing step. The ground state searching process S700 is started, for example, by receiving an instruction or the like from the user via the input device 14.

As illustrated in the figure, first, the model conversion unit 611 converts the problem data 601 into the Ising format problem data 602 (S711). If the storage unit 600 has already stored the Ising format problem data 602, the process S711 is omitted. The process of S711 and the process after S712 may be executed by different devices. In addition, the process of S711 and the process after S712 may be executed at different timings (for example, it is considered that the process of S711 is performed in advance).

Subsequently, the model coefficient setting unit 612 sets the values in the interaction coefficient memory 511 and the external magnetic field coefficient memory 512 (S712). The values of the memory can also be set or edited by the user via the user interface (implemented by, for example, the input device 14, the output device 15, the communication device 16, or the like).

Subsequently, the eigenvalue calculation unit 613 calculates the minimum eigenvalue of the adjacency matrix J stored in the interaction coefficient memory 511 to determine the value of the signal SW. As described above, this calculation may be performed in the arithmetic device 20 or in the processor 11 (S713).

Subsequently, the spin value initialization unit 614 initializes the values of the spins stored in the first spin memory 513a and the second spin memory 513b (S714).

Subsequently, the temperature setting unit 615 sets a temperature $T_k$ (k=1, 2, 3, . . . ) in Formulas 12 and 13 (S715). The above-mentioned subscript k represents the type of temperature T to be set.

Subsequently, the interaction arithmetic execution unit 616 generates the next state by executing the interaction arithmetic based on Formulas 12 and 13 (S716).

Subsequently, the interaction arithmetic execution unit 616 determines whether or not a stop condition is satisfied (for example, whether or not the temperature T has reached a preset minimum temperature) (S717). When the interaction arithmetic execution unit 616 determines that the stop condition is satisfied (YES in S717), the process proceeds to S718. On the other hand, when the interaction arithmetic execution unit 616 determines that the stop condition is not satisfied (NO in S717), the process returns to S716.

In S718, the spin value reading unit 617 reads and outputs the values of the spins stored in the first spin memory 513a and the second spin memory 513b. The ground state searching process S700 is ended.

Heretofore, as described in detail, according to the information processing apparatus 10 according to the present embodiment, it is possible to efficiently search for the ground state of the Ising model. Therefore, the combinatorial optimization problem can be solved efficiently. Since the information processing apparatus 10 (including the arithmetic device 20) has a simple structure, it is possible to inexpensively and easily manufacture the information processing apparatus 10.

Heretofore, although one embodiment has been described in detail, it goes without saying that the present invention is not limited to the above-described embodiment and can be variously modified without departing from the spirit thereof. For example, the above-described embodiment has been described in detail in order to explain the present invention for the better understanding, and thus, the embodiment is not necessarily limited to the embodiment including all the described configurations. In addition, a portion of the configurations of the above-described embodiment can be added, deleted, or replaced with another configuration.

In addition, each of the above-described configurations, functional units, processing units, processing means, and the like may be implemented by hardware by designing a portion or all thereof with, for example, integrated circuits. In addition, each of the above-described configurations, functions, and the like may be implemented by software by allowing the processor to interpret and execute a program that implements each function. Information such as programs, tables, and files implementing each function can be stored in a recording device such as a memory, a hard disk, or a solid state drive (SSD) or a recording medium such as an IC card, an SD card, or a DVD.

In addition, in each of the above-described figures, the control lines and information lines are illustrated as necessary for explanation, but not all the control lines and information lines in the implementation are necessarily illustrated. For example, it is considered that actually almost all configurations may be considered to be connected to each other.

In addition, the arrangement form of the various functional units, the various processing units, and the various databases of the information processing apparatus 10 described above is only an example. The arrangement form of the various functional units, the various processing units, and the various databases can be changed to an optimum arrangement form from the viewpoints of performance, processing efficiency, communication efficiency, and the like of the hardware and software included in the information processing apparatus 10.

In addition, the configuration of the database (schema or the like) storing various types of data described above can be flexibly changed from the viewpoints of efficient use of resources, improvement of processing efficiency, improvement of access efficiency, improvement of search efficiency, and the like.

INDUSTRIAL APPLICABILITY

The present invention can be used for information processing apparatuses, arithmetic devices, and information processing methods.

REFERENCE SIGNS LIST

10: information processing apparatus
11: processor
12: main storage device
20: arithmetic device
511: interaction coefficient memory
512: external magnetic field coefficient memory
513a: first spin memory
513b: second spin memory
514a: first selector
514b: second selector
515: product-sum arithmetic device
516: vector multiplier
517: adder
518: comparator
519: negation (NOT) circuit
600: storage unit
601: problem data
602: Ising format problem data
603: arithmetic device control program
611: model conversion unit
612: model coefficient setting unit
613: eigenvalue calculation unit
614: spin value initialization unit
615: temperature setting unit
616: interaction arithmetic execution unit
617: spin value reading unit

The invention claimed is:

1. An information processing apparatus comprising:
a storage unit which stores an energy function setting an interaction between an i-th spin of a first spin group and a j-th spin of a second spin group so that the i-th spin of the first spin group and the i-th spin of the second spin group have the same value in a ground state in an interaction relationship of an Ising model represented as a complete bipartite graph connecting N spins of the first spin group and N spins of the second spin group; and
a ground state searching unit which searches for the ground state of the Ising model based on the energy function and information unique to the spins,
wherein when the total number of spins of each of the first spin group and the second spin group is defined as N, an interaction coefficient between the i-th spin of the first spin group and the j-th spin of the second spin group is defined as $J_{i,j}$, and an interaction coefficient between the i-th spin of the first spin group and the i-th spin of the second spin group is defined as $w_i$, and
wherein the interaction coefficient $w_i$ is set to satisfy the following Formula given by a minimum eigenvalue $\lambda$ of a matrix in which elements of i-th rows and j-th columns are $J_{i,j}$ and diagonal components are 0 and any subset C of a spin array

[Formula 1]

$$w_i \geq \begin{cases} \sum_{v_j \in V} |J_{i,j}| - \frac{1}{2}\sum_{v_j \in C} |J_{i,j}| & (v_j \in C) \\ -\frac{\lambda}{2} & (v_j \notin C) \end{cases}$$

2. The information processing apparatus according to claim 1,
wherein the ground state searching unit:
searches for the ground state of the Ising model according to a simulated annealing algorithm,
obtains an acceptance probability (transition probability) $P(\sigma, \sigma')$ of state transition at a temperature T which is a parameter indicating easiness of transition between states from the following Formula based on a Metropolis method in the searching,

[Formula 2]

$$P(\sigma, \sigma') = \min\left\{1, \exp\left(-\frac{H(\sigma') - H(\sigma)}{T}\right)\right\}$$

when the values of the spins of the first spin group are expressed as $\sigma^L_1, \ldots, \sigma^L_N$, and the values of the spins of the second spin group are expressed as $\sigma^R_1, \ldots, \sigma^R_N$,
obtains a difference $\Delta H$ of the energy H at the time when the value $\sigma^R_i$ of the i-th spin of the second spin group is inverted from the following Formula, and

[Formula 3]

$$\Delta H = 2\sigma^R_i \left(h_i + w_i \sigma^L_i + \sum_{k \neq i} J_{i,k} \sigma^L_k\right)$$

obtains the difference $\Delta H$ of the energy H when the value $\sigma^L_i$ of the i-th spin of the first spin group is inverted from the following Formula, and

[Formula 4]

$$\Delta H = 2\sigma^L_i \left(h_i + w_i \sigma^R_i + \sum_{k \neq i} J_{i,k} \sigma^R_k\right)$$

when u (0<u≤1) is a uniform random number, determines a condition for accepting the state transition based on the following Formula $$\Delta H \leq -T \cdot \ln(u). \qquad \text{[Formula 5]}$$

3. The information processing apparatus according to claim 1,
wherein the ground state searching unit:
obtains a next state of the second spin group by the following Formula, and

[Formula 6]

$$\begin{bmatrix} \sigma^R_1 \\ \vdots \\ \sigma^R_n \end{bmatrix} \leftarrow \text{sign}\left(2h + 2J\begin{bmatrix} \sigma^L_1 \\ \vdots \\ \sigma^L_n \end{bmatrix} + 2\begin{bmatrix} w_i & & 0 \\ & \ddots & \\ 0 & & \omega_n \end{bmatrix}\begin{bmatrix} \sigma^L_1 \\ \vdots \\ \sigma^L_n \end{bmatrix} + T\begin{bmatrix} \ln u_1 & & 0 \\ & \ddots & \\ 0 & & \ln u_n \end{bmatrix}\begin{bmatrix} \sigma^R_1 \\ \vdots \\ \sigma^R_n \end{bmatrix}\right)$$

obtains a next state of the first spin group by the following Formula

[Formula 7]

$$\begin{bmatrix} \sigma^L_1 \\ \vdots \\ \sigma^L_n \end{bmatrix} \leftarrow$$

-continued $$\text{sign}\left(2h+2J\begin{bmatrix}\sigma_1^R\\ \vdots\\ \sigma_n^R\end{bmatrix}+2\begin{bmatrix}w_i & & 0\\ \vdots & \ddots & \vdots\\ 0 & & w_n\end{bmatrix}\begin{bmatrix}\sigma_1^R\\ \vdots\\ \sigma_n^R\end{bmatrix}+T\begin{bmatrix}\ln u_1 & & 0\\ \vdots & \ddots & \vdots\\ 0 & & \ln u_n\end{bmatrix}\begin{bmatrix}\sigma_1^L\\ \vdots\\ \sigma_n^L\end{bmatrix}\right).$$

4. The information processing apparatus according to claim 3, comprising one or more arithmetic devices, the arithmetic device including:
   an interaction coefficient memory which stores the interaction coefficients $J_{i,j}$;
   an external magnetic field coefficient memory which stores the external magnetic field coefficient $h_i$;
   a first spin memory which stores the values $\sigma^L_1, \ldots, \sigma^R_N$ of the spins in the first spin group;
   a second spin memory which stores the values $\sigma^R_1, \ldots, \sigma R^R_N$ of the spins in the second spin group;
   a product-sum arithmetic device which is input with a signal representing the value of the first spin memory or the value of the second spin memory, the value of the interaction coefficient memory, the value of the external magnetic field coefficient memory, and an N-dimensional vector $w=(W_1, \ldots, W_N)$;
   a vector multiplier which is input with the value of the first spin memory or the value of the second spin memory and the N-dimensional vector in which elements are random numbers independent of each other; and
   a comparator which is input with the N-dimensional vector output from the product-sum arithmetic device and the N-dimensional vector output from the vector multiplier, compares the corresponding elements of the input N-dimensional vectors with each other, and outputs a magnitude relationship between the elements.

5. The arithmetic device according to claim 4, comprising the interaction coefficient memory, the external magnetic field coefficient memory, the first spin memory, the second spin memory, the product-sum arithmetic device, the vector multiplier, and the comparator.

6. The arithmetic device according to claim 5, being implemented by any of a complementary metal oxide semiconductor (CMOS) circuit, a field programmable gate array (FPGA), and an (application specific integrated circuit (ASIC).

7. An information processing method of executing steps of:
   allowing an information processing apparatus to store an energy function setting an interaction between an i-th spin of a first spin group and a j-th spin of a second spin group so that the i-th spin of the first spin group and the i-th spin of the second spin group have the same value in a ground state in an interaction relationship of an Ising model represented as a complete bipartite graph connecting N spins of the first spin group and N spins of the second spin group; and
   allowing the information processing apparatus to search for the ground state of the Ising model based on the energy function and information unique to the spins,
   wherein when the total number of spins of each of the first spin group and the second spin group is defined as N, the value of the i-th spin of the first spin group in the ground state is defined as Si (i=1 to N), the value of the j-th spin of the second spin group in the ground state is defined as Sj (i=1 to N), an interaction coefficient between the i-th spin of the first spin group and the j-th spin of the second spin group is defined as $J_{i,j}$, and an interaction coefficient between the i-th spin of the first spin group and the i-th spin of the second spin group is defined as $w_i$, and
   the interaction coefficient $w_i$ is set to satisfy the following Formula given by a minimum eigenvalue $\lambda$ of a matrix in which elements of i-th rows and j-th columns are $J_{i,j}$ and diagonal components are 0 and any subset C of a spin array

[Formula 8]

$$w_i \geq \begin{cases} \sum_{v_j \in V}|J_{i,j}|-\frac{1}{2}\sum_{v_j \in C}|J_{i,j}| & (v_j \in C)\\ -\frac{\lambda}{2} & (v_j \notin C) \end{cases}.$$

8. The information processing method according to claim 7,
   wherein the information processing apparatus:
   searches for the ground state of the Ising model according to the algorithm of a simulated annealing method,
   obtains an acceptance probability (transition probability) $P(\sigma, \sigma')$ of state transition at a temperature T which is a parameter indicating easiness of transition between states from the following Formula based on a Metropolis method in the searching,

[Formula 9]

$$P(\sigma, \sigma') = \min\left\{1, \exp\left(-\frac{H(\sigma')-H(\sigma)}{T}\right)\right\}$$

when the values of the spins of the first spin group are expressed as $\sigma^L_1, \ldots, \sigma^L_N$, and the values of the spins of the second spin group are expressed as $\sigma^R_1, \ldots, \sigma^R_N$,
obtains a difference $\Delta H$ of the energy H when the value $\sigma^R_i$ of the i-th spin of the second spin group is inverted from the following Formula, and

[Formula 10]

$$\Delta H = 2\sigma^R_i\left(h_i + w_i\sigma^L_i + \sum_{k \neq i}J_{i,k}\sigma^L_k\right)$$

obtains the difference $\Delta H$ of the energy H when the value $\sigma^L_i$ of the i-th spin value of the first spin group is inverted from the following Formula, and

[Formula 11]

$$\Delta H = 2\sigma^L_i\left(h_i + w_i\sigma^R_i + \sum_{k \neq i}J_{i,k}\sigma^R_k\right)$$

when u (0<u≤1) is a uniform random number, determines a condition for accepting the state transition based on the following Formula $$\Delta H \leq -T \cdot \ln(u).$$ [Formula 12]

9. The information processing method according to claim 8,
wherein the information processing apparatus
obtains a next state of the second spin group by the following Formula, and

[Formula 13]

$$\begin{bmatrix} \sigma_1^R \\ \vdots \\ \sigma_n^R \end{bmatrix} \leftarrow$$

$$\text{sign}\left(2h+2J\begin{bmatrix} \sigma_1^L \\ \vdots \\ \sigma_n^L \end{bmatrix} + 2\begin{bmatrix} w_i & & 0 \\ \vdots & \ddots & \vdots \\ 0 & & \omega_n \end{bmatrix}\begin{bmatrix} \sigma_1^L \\ \vdots \\ \sigma_n^L \end{bmatrix} + T\begin{bmatrix} \ln u_1 & & 0 \\ \vdots & \ddots & \vdots \\ 0 & & \ln u_n \end{bmatrix}\begin{bmatrix} \sigma_1^R \\ \vdots \\ \sigma_n^R \end{bmatrix}\right)$$

obtains a next state of the first spin group by the following Formula

[Formula 14]

$$\begin{bmatrix} \sigma_1^L \\ \vdots \\ \sigma_n^L \end{bmatrix} \leftarrow$$

$$\text{sign}\left(2h+2J\begin{bmatrix} \sigma_1^R \\ \vdots \\ \sigma_n^R \end{bmatrix} + 2\begin{bmatrix} w_i & & 0 \\ \vdots & \ddots & \vdots \\ 0 & & w_n \end{bmatrix}\begin{bmatrix} \sigma_1^R \\ \vdots \\ \sigma_n^R \end{bmatrix} + T\begin{bmatrix} \ln u_1 & & 0 \\ \vdots & \ddots & \vdots \\ 0 & & \ln u_n \end{bmatrix}\begin{bmatrix} \sigma_1^L \\ \vdots \\ \sigma_n^L \end{bmatrix}\right).$$

* * * * *